United States Patent [19]

Granville

[11] Patent Number: 4,963,169
[45] Date of Patent: Oct. 16, 1990

[54] FUEL TANK VENTING SEPARATOR

[75] Inventor: Jeffrey H. Granville, Anacortes, Wash.

[73] Assignee: Racor Division of Parker Hannifin Corp., Cleveland, Ohio

[21] Appl. No.: 296,446

[22] Filed: Jan. 12, 1989

[51] Int. Cl.$^5$ ............................................. B01D 19/00
[52] U.S. Cl. ...................................... 55/185; 55/201; 220/85 V R; 220/86 R
[58] Field of Search ................. 55/168, 171, 176, 190, 55/185–188, 199, 178, 183, 184, 201; 220/85 V R, 85 F, 86 R; 210/188, 436, 472

[56] References Cited

U.S. PATENT DOCUMENTS

| | | | |
|---|---|---|---|
| 1,727,733 | 9/1929 | Stovall | 55/185 X |
| 2,414,158 | 1/1947 | Mock | 55/178 X |
| 2,556,319 | 6/1951 | Davis | 55/178 |
| 3,306,007 | 2/1967 | Glasgow | 55/185 X |
| 3,955,945 | 5/1976 | Bauer | 55/185 X |
| 3,981,156 | 9/1976 | Modisette et al. | 220/85 VR X |
| 3,992,172 | 11/1976 | Clark | 55/184 X |
| 4,630,749 | 12/1986 | Armstrong et al. | 220/86 R |
| 4,699,638 | 10/1987 | Harris | 55/168 |
| 4,769,050 | 9/1988 | Shaw et al. | 55/171 |
| 4,809,863 | 3/1989 | Woodcock et al. | 220/83 F |

FOREIGN PATENT DOCUMENTS

| | | | |
|---|---|---|---|
| 55-064148 | 5/1980 | Japan | 55/184 |
| 0912205 | 3/1982 | U.S.S.R. | 55/178 |
| 1036341 | 8/1983 | U.S.S.R. | 55/178 |
| 1068142 | 1/1984 | U.S.S.R. | 55/186 |

Primary Examiner—Robert Spitzer
Attorney, Agent, or Firm—Cassidy, Vance & Tarleton

[57] ABSTRACT

A fuel tank venting separator (10) having a chamber (50) in which is formed a first port (40) to conduct liquid (24) and gas (34) from a fuel tank (14), a second port (42) to vent gas (34) to the atmosphere and a plurality of openings (44) to return the liquid (24) to the tank (14). The chamber (50) is formed around the outside circumference of a fill tube member (36) installed in the fill tube (12) of the fuel tank (14). Alternatively, the separator (100) may be in the form of a canister (102) spliced into a vent line (134) through a Y-fitting (138). Liquid (120) and gas (122) vented through the vent line (134) enters the chamber (104) where the liquid (120) is returned to the tank (130) through a second hose (148) and the gas (122) is vented overboard through a third hose (150) attached to an overboard vent (136) such that contamination of the environment by the liquid (120) is prevented.

16 Claims, 3 Drawing Sheets

FUEL TANK VENTING SEPARATOR

TECHNICAL FIELD

The present invention pertains to fuel tank venting systems, and, more particularly, to a fuel tank venting separator that separates and returns liquid fuel entrapped in the vent line to the fuel tank to prevent overboard venting of liquid fuel.

BACKGROUND OF THE INVENTION

Fuel tanks typically have a fill tube attached to the tank to facilitate filling of the tank with liquid fuel. In transportation vehicles, and in particular watercraft, these fill tubes must be sealed off with a cap to keep contaminants out of the tank and to prevent the escape of liquid fuel and vapors. To maintain air pressure in the tank at ambient air pressure, a vent line that opens to the atmosphere is installed in the top of the tank. This permits fuel to be added to or removed from the tank without meeting resistance from positive or negative air pressure. This also prevents the dangerous build up of air pressure due to expansion of fuel in the tank.

In a typical watercraft installation, the fuel tank vent line opens to the exterior of the craft, generally over the water. This type of venting has the serious drawback of permitting liquid fuel entrapped in the vent line to be vented overboard into the water. Entrapment of liquid fuel in the vent line frequently occurs during refueling when fuel in the tank foams and splashes into the vent line. This also occurs when the boat is rocking at the dock or is underway with near full tanks. The presence of fuel outside the fuel tank creates a risk of extensive damage to property and serious injury to life should the fuel ignite. Furthermore, the presence of liquid fuel in the water is known to result in environmental damage and the desctruction of marine life.

SUMMARY OF THE INVENTION

The present invention pertains to a fuel tank venting separator for maintaining atmospheric pressure in the fuel tank while preventing the overboard venting of liquid fuel entrapped in the vent line. In one embodiment, the separator includes a chamber having three openings. The first opening admits liquid and vapor from a vent line attached to the top of the fuel tank. The second opening returns liquid to the fuel tank by the force of gravity. The third opening vents the vapor under positive pressure from the tank to the atmosphere and admits air from the atmosphere under negative pressure to the tank. The liquid and vapor are separated in the chamber by having the third opening separated from the first opening by a distance, preferably a vertical distance, with the third opening positioned above the first opening, such that liquid in the chamber will fall by the force of gravity to the second opening while the vapor will rise to the third opening to be vented from the chamber to the atmosphere.

In accordance with another aspect of the present invention, a baffle is formed in the chamber and positioned between the first and third openings to prevent the passage of liquid from the first opening to the third opening. Additionally, the first opening can be provided with a fitting that enters the chamber and turns downward to direct liquid in a downward direction.

In accordance with another embodiment of the invention, the separator comprises a chamber formed around the exterior of a fill tube that is connected to the tank. The interior of the chamber communicates with the interior of the fill tube through one or more openings in the fill tube. A first port in the chamber admits liquid and vapor from the tank while a second port in the chamber is used to vent vapor under positive pressure from the chamber to the atmosphere and to admit air under negative pressure to the chamber from the atmosphere.

As will be readily appreciated from the foregoing description, the separator formed in accordance with the present invention eliminates the discharge of liquid from the tank into the environment, helping to curb the build up of pollution in all inland and open waters. This is accomplished very efficiently by venting the tank through an accumulator chamber that separates the liquid from the vapor. The differential in air pressures normally encountered during refueling operations that causes liquid fuel to be vented overboard is avoided by not venting the tank directly to the atmosphere or directly to the fill tube, but rather venting the tank through a separation chamber and then to an overboard vent. As such, the separator formed in accordance with the present invention can be easily installed on existing fuel tanks, either by replacing a segment of the fill tube or by inserting the separator into the existing vent line. In either case, liquid fuel entrapped in the vent line will be returned to the fuel tank instead of being vented overboard to contaminate the environment. Although the present invention was developed for use with marine fuel tanks, it will be appreciated that it can have application to any venting system where it is desired to maintain a tank of liquid at ambient air pressure while preventing the overboard discharging of liquid stored in the tank.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein.

DETAILED DESCRIPTION OF THE PREFERRED EMBODIMENT

Figure 1:
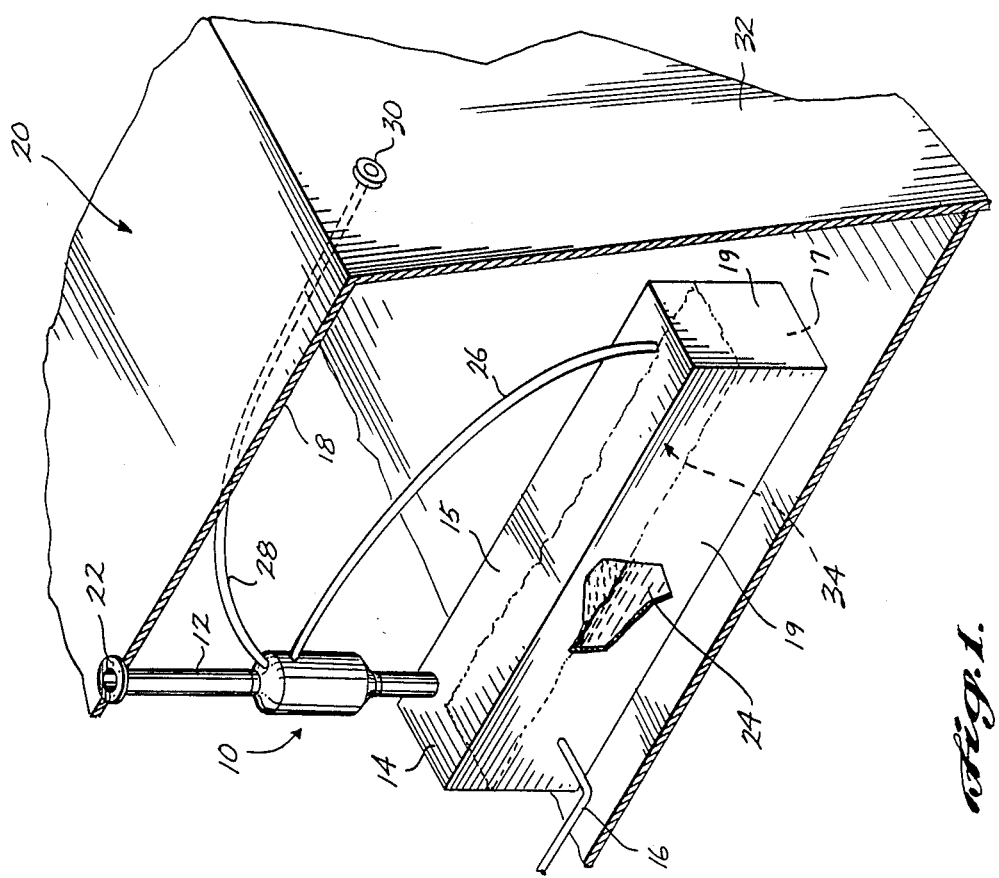
FIG. 1 is a side view of the fuel tank venting separator installed in the fill tube of a liquid fuel tank.

Referring initially to FIG. 1, a separator 10 formed in accordance with the present invention is shown installed in a fill tube 12 that is connected to a fuel tank 14. The fuel tank 14, shown for purposes of illustration, has a top 15, a bottom 17, and sides 19, and is mounted below the deck 18 of a marine craft 20. A gravity-fed fuel line 16 is connected to the side 19 of the tank 14 and leads to a fuel-powered engine (not shown). The fill tube 12 has an open end 22 positioned above the deck 18 to permit filling of the tank 14 with fuel 24 from a standard fuel pump nozzle (not shown).

A first vent line 26 is connected between the top 15 of the fuel tank 14 and the separator 10, and a second vent line 28 is connected between the separator 10 and an overboard vent 30 located on a bulkhead or hull 32. During refueling, fuel vapors 34 and liquid fuel 24 that become entrapped in the first vent line 26 are forced under positive pressure to the separator 10, where the liquid fuel 24 is separated out and returned to the tank 14 via the fill tube 12. The vapor 34 is conveyed through the second vent line 28 to the overboard vent 30 where it is vented to the atmosphere.

Figure 2:
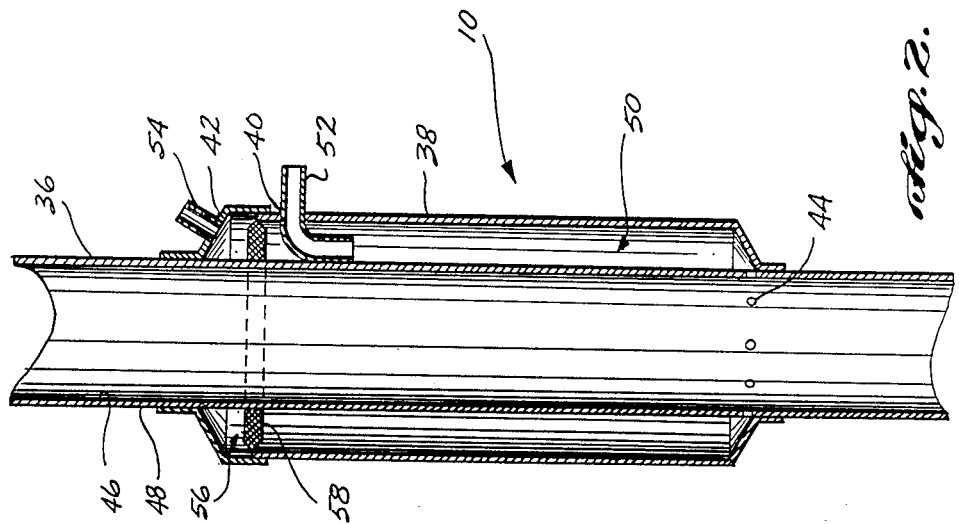
FIG. 2 is an enlarged cross-sectional view of the fuel tank venting separator of FIG. 1.

As shown in greater detail in the enlarged cross-sectional view of FIG. 2, the separator 10 includes a fill tube member 36, outer wall 38 on the outer surface 48 of the fill tube member 36, a first port 40 and a second port 42 formed in the outer wall 38, and a plurality of drain openings 44 in the fill tube member 36. The fill tube member 36, which can be spliced into an existing fill tube or installed directly on a fuel tank, communicates with the fuel tank 14 to permit liquid to be added into the tank 14 through the interior 46 of the tube 36. Preferably the outer wall 38 circumscribes the entire circumference of the outer surface 48 of the fill tube member 36 such that a chamber 50 is formed between the outer wall 38 and the fill tube member 36. A lesser portion of the fill tube member 36 may be circumscribed by the outer wall 38 to reduce the size of the chamber 50 to accommodate a restricted area or to decrease weight.

The first port 40 is formed in the outer wall 38 and communicates with the chamber 50. When installed in a marine craft 20, as shown in FIG. 1, the first port 40 has the first vent line 26 connected to it allow the passage of liquid 24 and vapor 34 from the fuel tank 14 to the chamber 50 as will be described more fully below. The first port 40 has a first fitting 52 mounted thereon with a substantially 90° bend to direct the flow of liquid 24 and vapor 34 downwardly towards the drain openings 44 in the fill tube member 36. The plurality of drain openings 44 are formed in the fill tube member 36 at the extreme lower portion of the chamber 50 as shown in FIG. 2 to return all liquid 24 in the chamber 50 to the tank 14.

Also shown in FIG. 2 is the second port 42 formed in the outer wall 38 at a position that is vertically higher than the first port 40. In addition, the second port 42 has a second fitting 54 attached thereto. The second fitting 54, which does not have a 90° bend as does the first fitting, has attached to it, as shown in FIG. 1, the second vent line 28. Although the second fitting 54 is shown positioned on the same side of the fill tube member as the first fitting 52, it is to be understood that the second fitting 54 may be placed at any horizontal position around the circumference of the outer wall 38. The second port 42 should have higher vertical position than the first port 40 in order to prevent the introduction of liquid 24 into the second vent line 28 through the second port 42. In embodiments where the second port 42 is positioned vertically below or is spaced a horizontal distance from the first port 40, it is desirable to have a baffle or wall positioned between the first and second ports 40 and 42 to prevent liquid 24 from entering the second vent line 28.

With the separator 10 so constructed, liquid 24 and vapor 34 entering through the first port 40 are directed downward through the first fitting 52. The liquid 24 falls by the force of gravity to the bottom of the chamber 50 and enters the interior 46 of the fill tube member 36 through the plurality of openings 44 to return to the fuel tank 14. Vapor 34 entering the chamber 50 is forced by the positive pressure of the entering liquid 24 and vapor 34 to rise upward past the first port 40 and exit the chamber 50 through the second port 42. The vapor 34 passes through the second vent line 28 to be discharged into the atmosphere through the overboard vent 30. When liquid 24 is being withdrawn from the tank 14 through the fuel line 16, the air pressure in the tank 14 is maintained at ambient pressure by air entering the overboard vent 30 and traveling through the second port 42 and the first port 40 to the interior of the tank 14.

In certain situations, liquid fuel will tend to foam, and this foam will enter the chamber 50 through the first vent line 26. To prevent the liquid in the foam from being vented overboard through the second vent line 28, a condensing device 56 is positioned across the chamber 50 between the first port 40 and the second port 42. In the embodiment illustrated in FIG. 2, the condensing device 56 comprises a screen mesh 58 that condenses the foam into a liquid that falls to the bottom of the chamber 50. The vapor 34 is forced by positive pressure to flow through the screen mesh 58 and exit the chamber 50 through the second port 42. The condensing device 56 may also be constructed of a thin sponge or other permeable material that permits the flow-through of vapor while preventing or restricting the passage of liquid.

Figure 3:
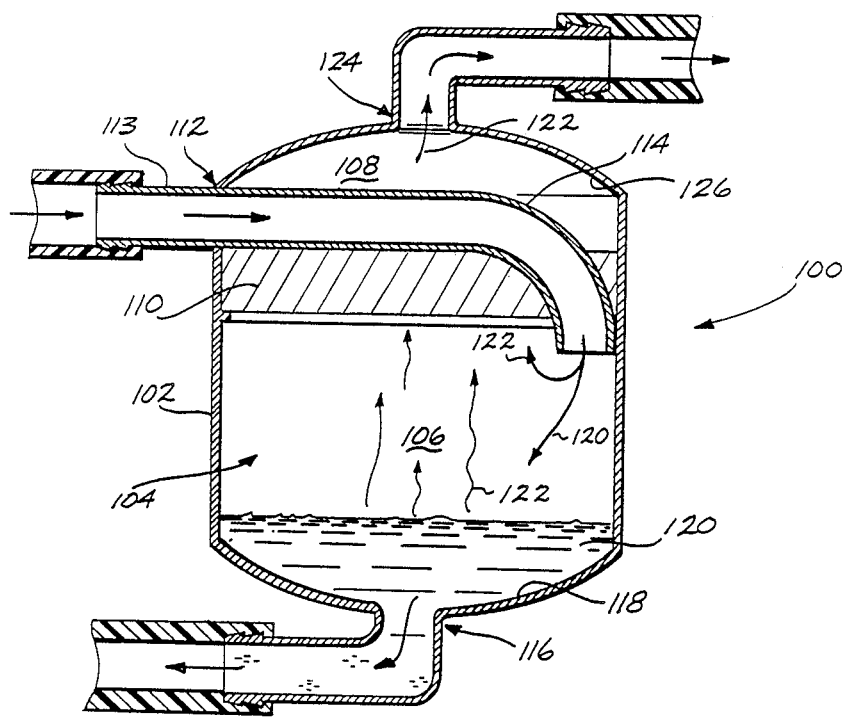
FIG. 3 is an enlarged cross-sectional view of an alternative embodiment of the fuel tank vent separator.

In some applications it may be unfeasible to install the separator within the fill tube of a fuel tank. In these instances, the present invention can be installed directly in the vent line between the fuel tank and the overboard vent. FIG. 3 illustrates a separator 100 designed to be installed in a vent line. The separator 100 includes a canister 102 having an interior chamber 104 that is divided into a lower portion 106 and an upper portion 108 by a condensing screen 110. Vapor 122 and liquid 120 from the fuel tank enter the canister 102 through a first port 112 that is positioned above the screen 110. The first port 112 includes a fitting 113 that has a curved end 114 that turns downward and passes through the screen 110 to direct the flow of liquid 120 to the lower portion 106 of the chamber 104. A second port 116 in the bottom 118 of the lower portion 106 carries the liquid 120 from the chamber 104 back to the fuel tank. Vapor 122 rises in the chamber 104 to a third port 124 in the top 126 of the upper portion 108 to be vented to the atmosphere. Foam is condensed by the screen 110 to separate the liquid from the entrapped vapor in the same manner as described with respect to the embodiment depicted in FIGS. 1 and 2.

Figure 4:
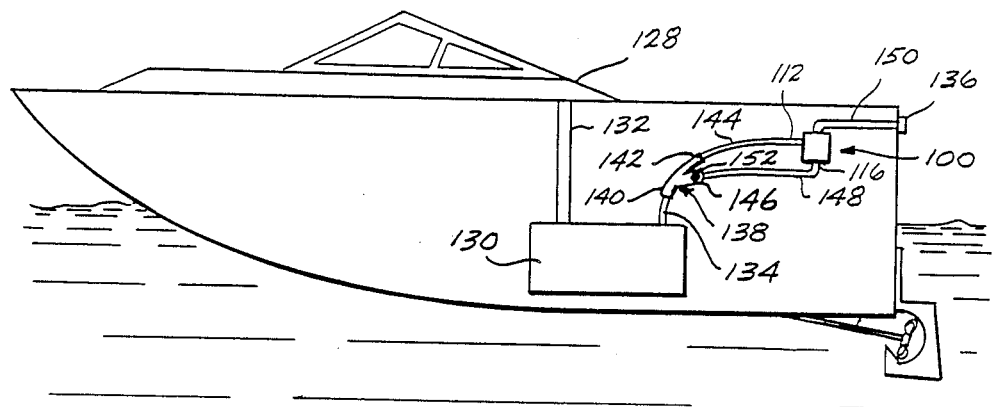
FIG. 4 is side view of the fuel tank vent separator of FIG. 3 installed in the vent line of a liquid fuel tank.

As illustrated in FIG. 4, the separator 100 is installed within a marine craft 128 that includes a fuel tank 130, a fill tube 132 connected to the tank 130, and a vent line 134 connected to the tank 130 that opens to the atmosphere through an overboard vent 136. The separator 100 is easily spliced into the existing vent line 134 by using a Y-fitting 138 connected between the tank 130 and the separator 100. The stem 140 of the Y-fitting is connected to the vent line 134 exiting from the fuel tank 130. The top arm 142 of the Y-fitting 138 is connected by a first hose 144 to the first port 112. The bottom arm 146 of the Y-fitting 138 is connected by a second hose 148 to the second port 116 in the bottom 118 of the chamber 104. Finally, the third port 124 is connected by a third hose 150, which may be part of the existing vent line 134, to the overboard vent 136. The canister 102 is attached to a suitable structural member, such as a bulkhead or the hull of the craft 128, and is positioned vertically higher than the Y-fitting 138 to allow liquid to flow from the canistor 102 to the Y-fitting 138 by the force of gravity. Likewise, the Y-fitting 138 is positioned vertically higher than the fuel tank 130 to permit liquid to flow to the tank 130 by the force of gravity.

With the separator 100 so installed, vapor and liquid rising out of the fuel tank 130 will pass through the vent line 134 and into the Y-fitting 138. A check valve in the form of a ball 152 in the bottom arm 146 of the fitting 138 is forced against a seat (not shown) under the positive pressure from the fuel tank 130, preventing the passage of liquid and vapor through the bottom arm 146. Consequently, the liquid and vapor pass through the top arm 142 and the first hose 144 to the separator 100. Once inside the chamber 104, the liquid 120 falls by the force of gravity to the lower portion 106 of the chamber 104 where it accumulates and returns to the fuel tank 130. The pressure of the returning liquid fuel 120 on the ball 152 is greater than the air pressure from the tank, the ball 152 unseats to thereby allow the liquid to flow through the bottom arm 146 of the Y-fitting 138 and into the tank 130. The rising vapor in the chamber 104 passes through the screen 110 to condense any foam that may be present, and then passes out of the separator 100 through the third port 124 to be vented through the overboard vent 136 to the atmosphere. As liquid 120 is withdrawn from the fuel tank 130, the negative air pressure in the vent line 134 unseats the ball 152 and draws air in through the overboard vent 136 where it passes through the separator 100 and both arms of the Y-fitting 138 to the fuel tank 130.

Figure 5:
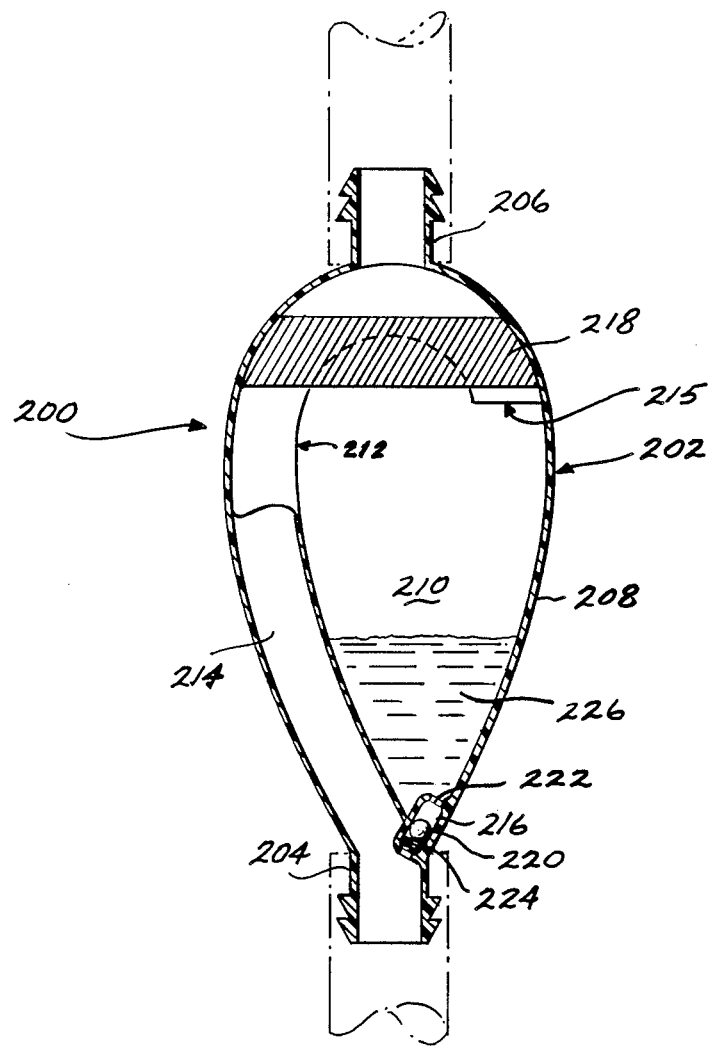
FIG. 5 is a cross-sectional view of an alternative embodiment of the fuel tank vent separator.

FIG. 5 illustrates yet another embodiment of the present invention, wherein the separator 200 is formed from a canistor 202 having a first port 204, a second port 206, an exterior wall 208 that encloses a chamber 210, and an interior wall 212 that divides and separates the first port 204 from the chamber 210. The interior wall 212 begins at the intersection of the first port 204 and the canister 202 and extends in spaced parallel relationship to the outer wall 208 past the second port 206. It then curves downward away from the outer wall 208 to form a tube that terminates with the open end 215 facing towards the first port 204. The passageway 214 conveys liquid and vapor entering the first port 204 around the canister 202, past the second port 206, and into the chamber 210.

The chamber 210 communicates with the first port 204 through a check valve 216 to allow liquid 226 to exit the chamber 210 and return to the fuel tank via the first port 204. The check valve 216 has a ball 220 biased against the seat 222 by a spring 224 to prevent the liquid and vapor from entering directly into the chamber 210 from the first port 204, thus forcing the liquid and vapor to first travel through the passageway 214 to enter the chamber 210. Vapor entering the chamber 210 rises or is forced out of the chamber 210 by the positive pressure of the entering liquid and vapor. A screen 218 is positioned across the chamber 210 to condense any foam that is present into liquid so that vapor passes from the chamber 210 to the second port 206. When the pressure of the liquid 226 in the chamber 210 is greater than the pressure at the first port 204, the ball 220 is pushed off the seat 222.

When installed within a fuel tank venting system, the separator 200 is merely spliced into an existing vent line. The first port 204 is connected to the fuel tank vent line and the second port 206 is connected to the overboard vent line. To properly function, the separator 200 should be installed so that the second port is vertically above the first port 204 to facilitate the return of fuel through the check valve 216 and the first port 204 by the force of gravity. To further facilitate installation, the first port 204 and the second port 206 can be constructed with flexible or ratcheting inlets that allow orientation of the ports at various angles to meet installation needs.

In applications where the separator will be conducting liquid fuel used with gasoline and diesel powered engines, the separator components should be constructed of steel or iron. Nonferrous materials such as aluminum, and nonmetallic materials such as plastic, should not be used in fuel systems because of their low melting points. In addition, in marine craft applications the fill tube member should be constructed of seamless drawn annealed copper pipe or tubing, nickel copper, or copper nickel pipe in order to meet Coast Guard requirements. These requirements are explained in further detail in Title 46 of the Code of Federal Regulations.

While a preferred embodiment of the invention has been illustrated and described, it is to be understood that various changes can be made therein without departing from the spirit and scope of the invention. Consequently, it is not intended that the invention be limited by the disclosure or by such modifications, but instead that its scope should be determined entirely by reference to the claims which follow hereinbelow.

The embodiments of the invention in which an exclusive property or privilege is claimed are defined as follows:

1. A liquid storage tank venting separator for continuously venting and maintaining atmospheric pressure in the tank while preventing the overboard venting of liquid, the separator comprising:
  chamber means;
  first means for providing unrestricted fluid communication between said chamber means and the tank to admit liquid and vapor from the tank to said chamber means and to conduct air from said chamber means to the tank, said first fluid communication means being independent of a fill tube for the tank;
  second means for providing fluid communication between said chamber means and the tank that is positioned vertically below the first fluid communicating means to return liquid falling by the force of gravity from the first fluid communicating means to the tank; and,
  third means for providing unrestricted fluid communication between said chamber means and the atmosphere that is independent of said first and said second fluid communication means and said chamber means to vent vapor from the chamber means to the atmosphere and to admit air from the atmosphere.

2. The separator of claim 1 further comprising means for condensing foam to liquid.

3. The separator of claim 2, wherein the said condensing means is mounted in said chamber and positioned between said first fluid communicating means and said third fluid communicating means.

4. A fuel tank venting separator for continuously venting and maintaining atmospheric pressure in a liquid fuel tank while preventing the overboard venting of liquid fuel from the tank, the separator comprising:
  chamber means;

a first opening in said chamber means to admit liquid and vapor to the chamber means from the tank and to conduct air from the chamber means to the tank;

a first unrestricted conducting means that is external to said chamber means and is connected to said first opening and the tank to conduct liquid and vapor;

a second opening in said chamber means for returning liquid to the tank;

a third opening in said chamber means to vent vapor under positive pressure from the chamber means to the atmosphere to admit air to the chamber means;

a second unrestricted conducting means that is external to said chamber means and connected to said third opening to conduct vapor to the atmosphere; and means for separating liquid and vapor entering said chamber means through said first opening such that the liquid is returned to the tank through said second opening without entering said third opening and the vapor is vented through said third opening to the atmosphere under positive pressure from said chamber means, and air is admitted through said third opening to said chamber from the atmosphere.

5. The separator of claim 4, wherein said separation means comprises a horizontal distance separating said first opening and said third opening such that liquid falls by the force of gravity to said second opening without entering said third opening.

6. The separator of claim 4, wherein said separation means comprises a vertical distance between said first opening and said third opening with said third opening being positioned vertically above said first opening.

7. The separator of claim 4, wherein said separation means includes a fitting means in said first opening that is configured to direct liquid entering said chamber means in a direction away from said third opening.

8. The separator of claim 4 further comprising means for condensing foam to liquid, said condensing means being mounted in said chamber means and positioned between said first opening and said third opening.

9. The separator of claim 4, further comprising a baffle means positioned between said first opening and said third opening to prevent liquid from entering said third opening.

10. The separator of claim 4, wherein said chamber means is formed around the exterior of a fill tube that communicates with the tank.

11. The separator of claim 10, wherein said second opening in said chamber means communicates with the fill tube such that liquid entering said chamber means is admitted to the fill tube through said second opening and thence into the tank.

12. A fuel tank venting separator for continuously venting and maintaining atmospheric pressure in a fuel tank while preventing the overboard venting of liquid fuel, the separator comprising:

fill tube means connected to the fuel tank;

wall means attached to the exterior of said fill tube means to form a chamber between said wall means and the exterior of said fill tube means;

one or more drain openings formed in said fill tube means and communicating between said chamber and the interior of said fill tube means to drain liquid from said chamber to said fill tube and thence to the tank;

a first port formed in said wall means to admit liquid and vapor to said chamber under positive pressure from the fuel tank through a first unrestricted tube means that is separate from said fill tube means and to admit air to the fuel tank;

a second port in said wall means that communicates with the atmosphere to vent vapor under positive pressure from said chamber to the atmosphere through a second unrestricted tube means that is separate from said fill tube means and to admit air from the atmosphere to said chamber; and means for separating the liquid fuel from the vapor such that the liquid fuel is returned to the fuel tank by the force of gravity and the vapor is vented under positive pressure from said chamber through the second port to the atmosphere.

13. The separator of claim 12, wherein said separation means comprises a vertical distance between said first port and said second port with said first port being positioned vertically below said second port such that liquid fuel entering said chamber through said first port will fall by the force of gravity to said one or more openings by the fill tube means without entering said second port.

14. The separator of claim 13, wherein said separation means further comprises a fitting in said first port configured to direct the liquid fuel away from said second port as it enters said chamber.

15. The separator of claim 13, wherein said separation means further includes a baffle positioned in said chamber between said first and second ports to prevent liquid fuel from entering said second port.

16. The separator of claim 13, further comprising a screen for condensing foam to liquid, said screen being positioned in said chamber between said first port and said second port.

* * * * *